United States Patent
Takizawa (10) Patent No.: US 6,740,457 B2
(45) Date of Patent: May 25, 2004

(54) COLOR FILTER SUBSTRATE AND METHOD FOR MAKING THE SAME, ELECTRO-OPTICAL DEVICE AND METHOD FOR MAKING THE SAME, AND ELECTRONIC APPARATUS

(75) Inventor: Keiji Takizawa, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/278,561

(22) Filed: Oct. 23, 2002

(65) Prior Publication Data
US 2003/0082465 A1 May 1, 2003

(30) Foreign Application Priority Data
Oct. 31, 2001 (JP) ........................ 2001-334608

(51) Int. Cl.[7] .................... G02B 5/20; G03F 1/1335
(52) U.S. Cl. ........................... 430/7; 349/106
(58) Field of Search .................. 430/7; 349/106

(56) References Cited

U.S. PATENT DOCUMENTS 6,271,902 B1 * 8/2001 Ogura et al. ............. 349/106
2003/0021000 A1 * 1/2003 Takizawa et al. ......... 359/263

* cited by examiner

Primary Examiner—John A. McPherson
(74) Attorney, Agent, or Firm—Harness, Dickey & Pierce, P.L.C.

(57) ABSTRACT

A color filter substrate 210 has pixel regions Pr, Pg, and Pb. Light shielding regions BR are respectively provided between these adjacent pixel regions. A red colored layer 213r is disposed on a substrate 211 inside the pixel region Pr. A green colored layer 213g is disposed on the substrate 211 inside the pixel region Pg. A blue colored layer 213b is disposed on the substrate 211 inside the pixel region Pb. Inside each of the light-shielding regions BR, a reflective light-shielding layer 212B is disposed on the substrate 211. The colored layers 213r, 213g, and 213b are stacked on the reflective light-shielding layer 212B.

36 Claims, 7 Drawing Sheets

COLOR FILTER SUBSTRATE AND METHOD FOR MAKING THE SAME, ELECTRO-OPTICAL DEVICE AND METHOD FOR MAKING THE SAME, AND ELECTRONIC APPARATUS

BACKGROUND OF THE INVENTION

1. Technical Field of the Invention

The present invention relates to a color filter substrate and a method for making the same, an electro-optical device and a method for making the same, and an electronic apparatus. The present invention relates particularly to a structure which can be suitably applied to a light shielding element of a display device.

2. Description of the Related Art

Generally, various electro-optical devices, such as liquid crystal displays, electroluminescent displays, and plasma displays, sometimes comprise color filters in which a plurality of colored layers in different colors are arrayed to achieve color display. In color filters, colored layers of, for example, three colors, i.e., red, green, and blue, are arrayed in a predetermined two-dimensional array pattern such as a stripe array, a diagonal mosaic array, or the like known in the art.

Figure 10:
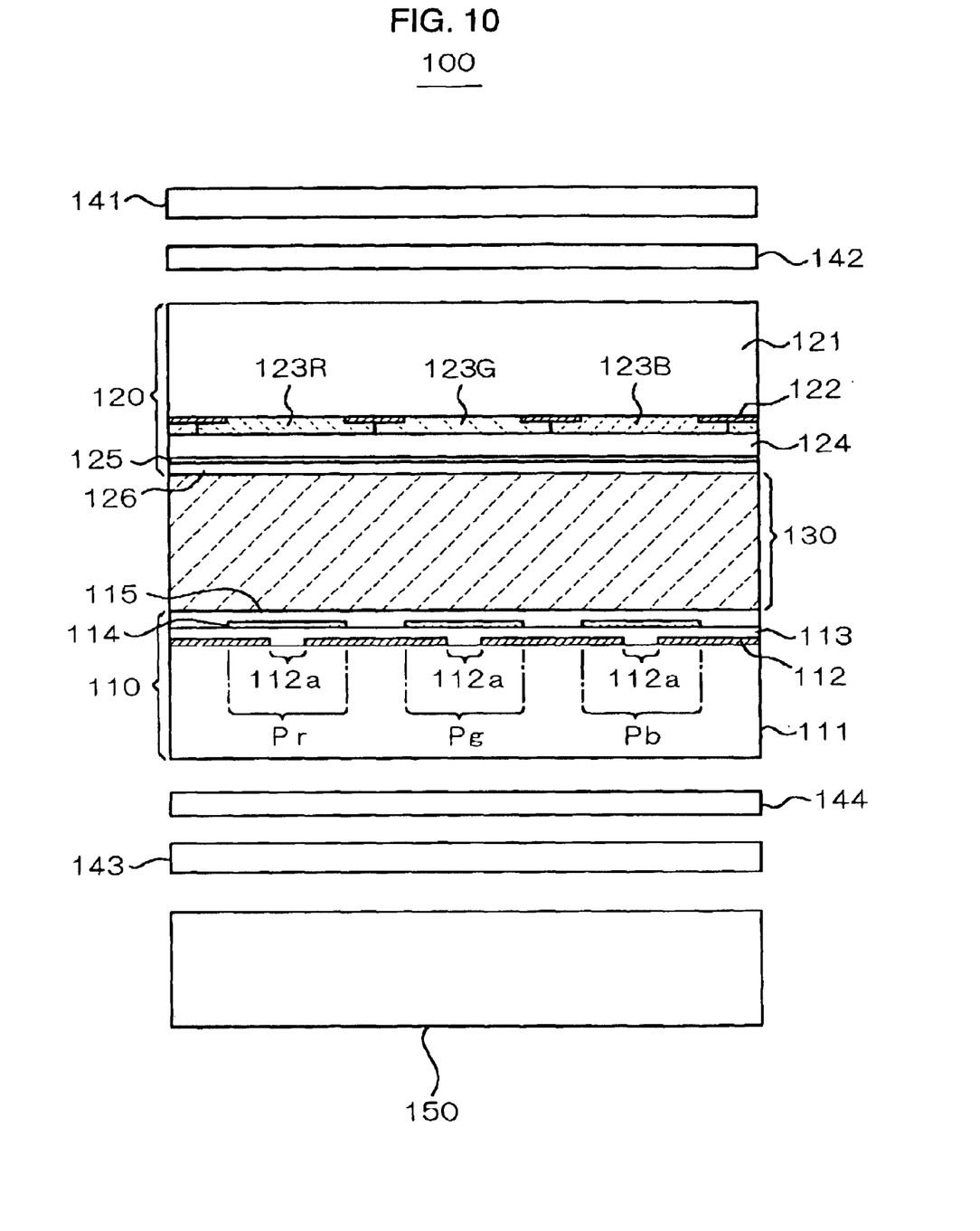
FIG. 10 is a schematic cross-sectional view showing the structure of a conventional liquid crystal display.

FIG. 10 is a schematic cross-sectional view illustrating the structure of a conventional transflective liquid crystal display 100. The liquid crystal display 100 comprises: a reflecting substrate 110 of a half-transmissive structure including a first substrate 111; a counter substrate 120 including a substrate 121; a liquid crystal layer 130 held between the reflecting substrate 110 and the counter substrate 120; a polarizer 141 and a quarter-wave plate 142 disposed on the outer face of the counter substrate 120; a polarizer 143 and a quarter-wave plate 144 disposed on the outer face of the reflecting substrate 110; and a backlight 150 disposed on the outer face of the polarizer 143.

The reflecting substrate 110 comprises: a reflecting layer 112 formed on the first substrate 111; a transparent insulating layer 113 formed on the reflecting layer 112; electrodes 114 composed of a transparent conductor such as indium tin oxide (ITO); and an alignment film 115.

The counter substrate 120 comprises: light shielding layers 122 formed on the substrate 121; a red colored layer 123R, a green colored layer 123G, and a blue colored layer 123B arranged in pixel regions Pr, Pg, and Pb, respectively, according to a predetermined pattern; a transparent protection layer 124 formed on the colored layers 123R, 123G, and 123B; counter electrodes 125 made of a transparent conductor disposed on the protection layer 124; and an alignment film 126 formed on the counter electrodes 125.

The reflecting layer 112 of the liquid crystal display 100 has an aperture 112a formed in each of the pixel regions Pr, Pg, and Pb and allows light from the backlight 150 to pass through the apertures 112a so as to achieve transmissive display. Meanwhile, since external light entering from the observer side, i.e., the upper side in the drawing, is reflected at the portions of the reflecting layer 112 inside the pixel regions Pr, Pg, and Pb, reflective display is achieved. Thus, the liquid crystal display 100 is of a transflective type.

The light shielding layers 122 are formed on the substrate 121 in positions above the gaps between the pixel regions Pr and Pg, Pg and Pb, and Pb and Pr. Each of the light shielding layers 122 has a laminated structure of two or three layers in which, for example, a chromium thin film and a chromium oxide thin film are stacked so that the light shielding layers 122 hardly reflects external light and appear black when viewed from the observer side, i.e., the upper side in the drawing.

However, in the conventional liquid crystal display 100, the light shielding layers 122 must have a laminated structure to prevent a decrease in the contrast due to reflection at the light shielding layers 122 when viewed from the observer side. Thus, the number of process steps increases, and so does the manufacturing cost, which is a problem.

Moreover, in the light shielding layers 122, the thickness of a reflecting material, such as Cr, must be large enough to achieve a high light-shielding effect; thus, forming the light shielding layers 122 takes long time. This results in a decrease in production efficiency and an increase in manufacturing cost, which is a problem.

Furthermore, although the light shielding layers 122 appear black when observed from the observer side, i.e., from the substrate 121 side, the light shielding layers 122 are configured to reflect light when viewed from the opposite side, i.e., the first substrate 111 side. Thus, in order to avoid a decrease in contrast due to reflection of light at the light shielding layers 122, a color filter comprising colored layers and a protection layer cannot be formed on the reflecting substrate 110, i.e., the substrate at the side opposite to the observer side. Such a structure, which is opposite to the above-described structure, cannot be employed, which is a problem.

The present invention aims to overcome the above-described problems. An object of the present invention is to provide a color filter substrate, an electro-optical device, and methods for manufacturing the same that can prevent an increase in the number of the process steps and the manufacturing cost. Another object of the present invention is to provide a color filter substrate, an electro-optical device, and methods for manufacturing the same that can shorten the time required for forming the light shielding structure and increase the production efficiency. Yet another object of the present invention is to provide a color filter substrate, an electro-optical device, and methods for manufacturing the same that can operate without trouble even when a color filter is formed on the reflecting substrate, i.e., the substrate at the side opposite to the observer side, or when a substrate incorporating a color filter is used as the reflecting substrate, i.e., the substrate at the side opposite to the observer side.

SUMMARY OF THE INVENTION

To overcome the above-described problems, the present invention provides a color filter substrate comprising a substrate, a reflective light-shielding layer, and a plurality of colored layers of different colors, wherein the plurality of colored layers of different colors are stacked in a plan view at the reflective light-shielding layer.

According to this invention, a plurality of colored layers of different colors is stacked in a plan view at a reflective light-shielding layer. Thus, particularly when observed from the plurality of colored-layers side, degradation in display contrast due to the reflection of light can be prevented because light reflected at the reflective light-shielding layer can be efficiently absorbed by the plurality of colored layers of different colors. Even when observed from the reflective-light-shielding-layer side, degradation in contrast can also be prevented because the reflectance of the reflective light shielding layer is decreased. In such a case, a sufficient light-shielding effect can be obtained due to the presence of the plurality of colored layers even when the reflectance of the reflective light-shielding layer is decreased.

Since only stacking of the plurality of colored layers at the reflective light-shielding layer is necessary, no additional step is required, thereby preventing an increase in the manufacturing cost. Moreover, since the plurality of colored layers are stacked in a plan view at the reflective light-shielding layer, a sufficient light-shielding effect can be achieved without increasing the thickness of the reflective light-shielding layer, thereby reducing time required to form the reflective light-shielding layer, improving the productivity, and decreasing the cost. Furthermore, a decrease in contrast due to reflection of light can be prevented even when a color filter is formed on a reflecting substrate or a substrate at the side opposite to the observation side.

The reflective light-shielding layer is preferably composed of metal material to reduce the manufacturing cost and time. The metal material may be aluminum, silver, tantalum, nickel, chromium, or an alloy thereof.

In preparing a primary-color system color filter, for example, red (R), green (g), and blue (b) colored layers are used as the above-described colored layers. In this case, at least two colored layers of two different colors among three colors must be stacked in a plan view at the reflective light-shielding layer. In this invention, preferably, the colored layers of all the colors, i.e., three colored layers in the above example, are stacked in a plan view at the reflective light-shielding layer so as to reduce reflected light at the reflective light-shielding layer.

In this invention, preferably, the reflective light-shielding layer is disposed on the substrate, and the plurality of colored layers of different colors are stacked on the reflective light-shielding layer.

According to this invention, reflection of light at the reflective light-shielding layer can be decreased and a decrease in display contrast can be prevented particularly when the substrate of an electro-optical device is disposed at the side opposite to the observation side.

In this invention, a reflecting layer is preferably formed inside a region where only one of the plurality of colored layers is provided. More preferably, the reflective light-shielding layer is either integral with the reflecting layer or composed of the same material as that of the reflecting layer.

According to this invention, because the reflective light-shielding layer is integral with the reflecting layer or is made of the same material as the reflecting layer, the reflective light-shielding layer and the reflecting layer can be formed in the same step. Thus, the number of steps can be decreased, and so can the manufacturing cost.

In this invention, the colored layers stacked in a plan view at the reflective light-shielding layer preferably include a red colored layer and a blue colored layer.

According to this invention, since the red colored layer and the blue colored layer are stacked in a plan view at the reflective light-shielding layer, almost all light in the visible wavelength region reflected at the reflective light-shielding layer can be sufficiently absorbed by the colored layers. Thus, a decrease in display contrast due to the reflection of light can be prevented.

In this invention, only a colored layer of one color out of the plurality of colored layers is preferably formed in a region disposed on one side of the reflective light-shielding layer, and only another colored layer of a different color out of the plurality of colored layers is formed in a region disposed on the other side of the reflective light-shielding layer. The colored layers of the one color and the different color preferably extend over the reflective light-shielding layer so as to be stacked.

According to this invention, because the colored layers in the regions adjacent to the reflective light-shielding layer, i.e., the regions being disposed respectively at one side and the other side of the reflective light-shielding layer, extend over the reflective light-shielding layer, the array pattern of the colored layers can be simplified, thereby facilitating the production. Herein, the term "the other side" does not necessarily mean the side opposite to the "one side" but means simply a different side from the "one side".

Next, the present invention provides a method for making a color filter substrate comprising a substrate, a reflective light-shielding layer, and a plurality of colored layers of different colors, the method comprising a step of forming the plurality of colored layers of different colors so that the plurality of colored layers are stacked in a plan view at the reflective light-shielding layer.

According to this invention, the plurality of colored layers of different colors is stacked in a plan view at the reflective light-shielding layer. Thus, when observed from the colored-layers side, degradation in display contrast due to the reflection of light can be prevented because light reflected at the reflective light-shielding layer can be efficiently absorbed by the colored layers of different colors. Even when observed from the reflective-light-shielding-layer side, degradation in contrast can also be prevented because the reflectance of the reflective light shielding layer is decreased. In such a case, a sufficient light-shielding effect can be obtained due to the presence of the plural colored layers even when the reflectance of the reflective light-shielding layer is decreased.

Since only stacking of the plural colored layers at the reflective light-shielding layer in a plan view is necessary, no additional step is required, thereby preventing an increase in the manufacturing cost. Moreover, since the plurality of colored layers are stacked in a plan view at the reflective light-shielding layer, a sufficient light-shielding effect can be achieved without increasing the thickness of the reflective light-shielding layer, thereby reducing time required for forming the reflective light-shielding layer, improving the productivity, and decreasing the cost. Furthermore, a decrease in contrast due to reflection of light can be prevented even when a color filter is formed on a reflecting substrate or a substrate at the side opposite to the observation side.

In this invention, the reflective light-shielding layer is preferably formed on the substrate, and the plurality of colored layers of different colors are preferably stacked on the reflective light-shielding layer.

According to this invention, the reflection of light at the reflective light-shielding layer can be decreased and a decrease in display contrast can be prevented when the color filter substrate of an electro-optical device is disposed at the side opposite to the observation side.

In this invention, a reflecting layer is preferably formed in a region where only one of the plurality of colored layers is formed, and, preferably, the reflective light-shielding layer and the reflecting layer are simultaneously formed with the same material.

According to this invention, because the reflective light-shielding layer and the reflecting layer can be simultaneously formed with the same material, the number of steps can be decreased, and so can the manufacturing cost.

In this invention, the colored layers stacked in a plan view at the reflective light-shielding layer preferably include a red colored layer and a blue colored layer.

According to this invention, since the red colored layer and the blue colored layer are stacked in a plan view at the reflective light-shielding layer, almost all light in the visible wavelength region reflected at the reflective light-shielding layer can be sufficiently absorbed by the colored layers. Thus, a decrease in display contrast due to the reflection of light can be prevented.

In this invention, preferably, only a colored layer of one color out of the plurality of colored layers is formed in a region on one side of the reflective light-shielding layer, only another colored layer of a different color out of the plurality of colored layers is formed in a region on another side of the reflective light-shielding layer, and the colored layers of the one color and the different color extend over the reflective light-shielding layer so as to be stacked thereat.

According to this invention, because the colored layers in the regions adjacent to the reflective light-shielding layer, i.e., the regions being disposed at both sides of the reflective light-shielding layer, extend over the reflective light-shielding layer, the array pattern of the colored layers can be simplified, thereby facilitating the production.

Next, the present invention provides an electro-optical device comprising an electro-optical layer, a reflective light-shielding layer, and a plurality of colored layers of different colors. The plurality of colored layers of different colors are stacked at the reflective light-shielding layer.

According to this invention, the plurality of colored layers of different colors is stacked in a plan view at the reflective light-shielding layer. Thus, when observed from the plurality of colored-layers side, degradation in display contrast due to the reflection of light can be prevented because light reflected at the reflective light-shielding layer can be efficiently absorbed by the plurality of colored layers of different colors. Even when observed from the reflective-light-shielding-layer side, degradation in contrast can also be prevented because the reflectance of the reflective light shielding layer is decreased. In such a case, a sufficient light-shielding effect can be obtained due to the presence of the plurality of colored layers even when the reflectance of the reflective light-shielding layer is decreased.

Since only stacking of the plural colored layers at the reflective light-shielding layer in a plan view is necessary, no additional step is required, thereby preventing an increase in the manufacturing cost. Moreover, since the plurality of colored layers are stacked in a plan view at the reflective light-shielding layer, a sufficient light-shielding effect can be achieved without increasing the thickness of the reflective light-shielding layer, thereby shortening the time required for forming the reflective light-shielding layer, improving the productivity, and decreasing the cost. Furthermore, a decrease in contrast due to reflection of light can be prevented even when a color filter is formed on a reflecting substrate or a substrate at the side opposite to the observation side.

The reflective light-shielding layer is preferably composed of metal to reduce the manufacturing cost and time. The metal material may be aluminum, silver, tantalum, nickel, chromium, or an alloy thereof.

In preparing a primary-color system color filter, for example, red (R), green (G), and blue (B) colored layers are used as the above-described colored layers. In this case, at least two colored layers of two different colors among three colors must be stacked in a plan view at the reflective light-shielding layer. In this invention, preferably, the colored layers of all the colors, i.e., three colored layers in the above example, are stacked in a plan view at the reflective light-shielding layer so as to reduce reflected light at the reflective light-shielding layer.

It should be noted that in this invention, as described below, the reflective light-shielding layer is preferably disposed at the side opposite to the observation side of the device relative to the plurality of colored layers stacked in a plan view. However, even when the reflective light-shielding layer is disposed at the observation side of the device relative to the plurality of colored layers stacked in a plan view, light can still be sufficiently shielded because the plurality of colored layers are stacked in a plan view at the reflective light-shielding layer. A sufficient light-shielding effect can be achieved when the thickness of reflective light-shielding layer is reduced to decrease the reflectance of the reflective light-shielding layer. Thus, degradation in display contrast due to the reflection of light at the reflective light-shielding layer can be prevented.

In this invention, the reflective light-shielding layer is preferably disposed on a substrate, and the plurality of colored layers of different colors are preferably stacked in a plan view on the reflective light-shielding layer.

According to this invention, when viewed from the colored-layers side, the reflection of light at the reflective light-shielding layer can be decreased, and a decrease in display contrast can be prevented. Thus, even when the substrate is disposed in the electro-optical device at the side opposite to the observation side, reflection of light can be prevented, and light can be satisfactorily shielded.

In this invention, a reflecting layer is preferably disposed in the region where only one of the plurality of colored layers is formed. In this case, the reflective light-shielding layer is preferably either integral with the reflecting layer, or composed of the same material as that of the reflecting layer.

According to this invention, because the reflective light-shielding layer is integral with the reflecting layer or is made of the same material as the reflecting layer, the reflective light-shielding layer and the reflecting layer can be formed in the same step. Thus, the number of steps can be decreased, and so can the manufacturing cost.

In this invention, the colored layers stacked in a plan view at the reflective light-shielding layer preferably include a red colored layer and a blue colored layer.

According to this invention, since the red colored layer and the blue colored layer are stacked in a plan view at the reflective light-shielding layer, almost all light in the visible wavelength region reflected at the reflective light-shielding layer can be sufficiently absorbed by the colored layers. Thus, a decrease in display contrast due to the reflection of light can be prevented.

In this invention, a colored layer of one color is preferably formed in a region disposed on one side of the reflective light-shielding layer, and another colored layer of a different color is preferably formed in a region disposed on another side of the reflective light-shielding layer. The colored layers of the one color and the different color preferably extend over the reflective light-shielding layer so as to be stacked thereat.

According to this invention, because the colored layers in the regions adjacent to the reflective light-shielding layer, i.e., the regions being disposed at both sides of the reflective light-shielding layer, extend over the reflective light-shielding layer, the array pattern of the colored layers can be simplified, thereby facilitating the production.

In this invention, the reflective light-shielding layer is preferably disposed at the side of the stacked colored layers opposite to a viewing side of the device.

According to this invention, because the reflective light-shielding layer is disposed at the side opposite to the observation side of the device relative to the plurality of colored layers stacked in a plan view, reflection of light at the reflective light-shielding layer is hardly recognizable in the display. Thus, a decrease in display contrast can be prevented.

Next, the present invention provides a method for making an electro-optical device comprising an electro-optical layer, a reflective light-shielding layer, and a plurality of colored layers of different colors, the method comprising a step forming the plurality of colored layers of different colors so that the plurality of colored layers are stacked in a plan view at the reflective light-shielding layer.

According to this invention, a plurality of colored layers of different colors is stacked at a reflective light-shielding layer. Thus, when observed from the plurality of colored-layers side, degradation in display contrast due to the reflection of light can be prevented because light reflected at the reflective light-shielding layer can be efficiently absorbed by the colored layers of different colors. Even when observed from the reflective-light-shielding-layer side, degradation in contrast can also be prevented because the reflectance of the reflective light shielding layer is decreased. In such a case, a sufficient light-shielding effect can be obtained due to the presence of the plurality of colored layers even when the reflectance of the reflective light-shielding layer is decreased.

Since only stacking of the plurality of colored layers at the reflective light-shielding layer in a plan view is necessary, no additional step is required, thereby preventing an increase in the manufacturing cost. Moreover, since the plurality of colored layers are stacked in a plan view at the reflective light-shielding layer, a sufficient light-shielding effect can be achieved without increasing the thickness of the reflective light-shielding layer, thereby reducing the time required for forming the reflective light-shielding layer, improving the productivity, and decreasing the cost. Furthermore, a decrease in contrast due to reflection of light can be prevented even when a color filter is formed on a reflecting substrate or a substrate at the side opposite to the observation side.

In this invention, preferably, the reflective light shielding layer is formed on a substrate, and the colored layers of different colors are formed on the reflective light-shielding layer so that the colored layers of different colors are stacked thereon in a plan view.

According to this invention, reflection of light at the reflective light-shielding layer can be decreased and a decrease in display contrast can be prevented when the color filter substrate comprising the substrate disposed at the side opposite to the observation side is employed.

In this invention, preferably, a reflecting layer is formed inside a region where only one of the plurality of colored layers is provided, and the reflecting layer and the reflective light-shielding layer are simultaneously formed with the same material.

According to this invention, because the reflective light-shielding layer and the reflecting layer can be simultaneously formed with the same material, the number of steps can be decreased, and so can the manufacturing cost.

In this invention, preferably, the colored layers stacked in a plan view at the reflective light-shielding layer include a red colored layer and a blue colored layer.

According to this invention, since the red colored layer and the blue colored layer are stacked in a plan view at the reflective light-shielding layer, almost all light in the visible wavelength region reflected at the reflective light-shielding layer can be sufficiently absorbed by the colored layers. Thus, a decrease in display contrast due to the reflection of light can be prevented.

In this invention, preferably, only one color layer of one color out of the plurality of colored layers is formed in a region on one side of the reflective light-shielding layer, and only another colored layer of a different color out of the plurality of colored layers is formed in a region on another side of the reflective light-shielding layer. The colored layers of the one color and the different color preferably extend over the reflective light-shielding layer so as to be stacked thereat.

According to this invention, because the colored layers in the regions adjacent to the reflective light-shielding layer, i.e., the regions being disposed at both sides of the reflective light-shielding layer, extend over the reflective light-shielding layer, the array pattern of the colored layers can be simplified, thereby facilitating the production.

Next, the present invention provides an electronic device including any one of the above-described electro-optical devices and a controlling unit for controlling the electro-optical device. In various electronic apparatuses incorporating the present invention, the display section of the electronic device can be easily observed since reflection of light can be decreased while maintaining a light-shielding effect and a decrease in display contrast can be inhibited. Moreover, an increase in manufacturing cost can be inhibited, and the electronic apparatuses can be supplied at lower prices. The present invention is particularly suitable when applied to portable electronic apparatuses such as cellular phones and portable information terminals.

DETAILED DESCRIPTION OF THE PREFERRED EMBODIMENTS

A color filter substrate, a method for making the same, an electro-optical device, a method for making the same, and an electronic apparatus of the present invention will now be described in detail by way of embodiments with reference to the attached drawings.

First Embodiment

Figure 1:
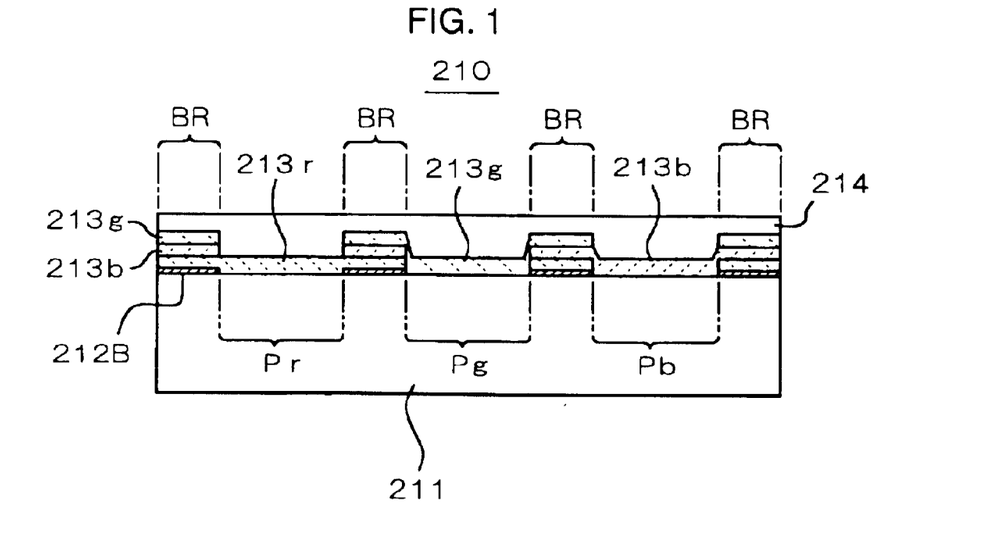
FIG. 1 is a schematic cross-sectional view illustrating the structure of a color filter substrate according to a first embodiment of the present invention.

A color filter substrate according to a first embodiment of the present invention will now be described with reference to FIG. 1. In a color filter substrate 210 of the first embodiment, reflective light-shielding layers 212B, colored layers 213r, 213g, and 213b, and a protection layer 214 are formed on a substrate 211 composed of glass or plastic. The color filter substrate 210 has pixel regions Pr, Pg, and Pb and light-shielding regions BR between adjacent pixel regions. The red colored layer 213r is disposed in the pixel region Pr on the substrate 211. The green colored layer 213g is disposed in the pixel region Pg on the substrate 211. The blue colored layer 213b is disposed in the pixel region Pb on the substrate 211. In the light-shielding regions BR, the light-shielding layers 212B are disposed on the substrate 211, and the colored layers 213r, 213g, and 213b are stacked and disposed on the light-shielding layers 212B.

In making the color filter substrate 210, a reflective material, e.g., a metal material such as aluminum, silver, tantalum, nickel, chromium, or an alloy thereof is deposited on the substrate 211 by a gas phase deposition method such as a vapor deposition method or a sputtering method. The deposited layer is then patterned to form the light-shielding layers 212B. The thickness of the light-shielding layers 212B is 500 to 3000 angstroms, and preferably approximately 2000 angstroms.

Next, a photosensitive resin prepared by dispersing a colorant such as pigment or dye into a transparent resin is applied to the substrate 211, is exposed, and is developed to sequentially form colored layers 213r, 213b, and 213g having predetermined patterns. Here, the colored layer 213r is formed over the pixel region Pr and the light-shielding regions BR; the colored layer 213g is formed over the pixel region Pg and the light-shielding regions BR; and the colored layer 213b is formed over the pixel region Pb and the light-shielding regions BR.

The thickness of each colored layer is 0.5 to 2 μm, and more preferably approximately 1 μm.

After the colored layers 213r, 213g, and 213b are formed as above, the protection layer 214 is formed to cover all of these layers. The protection layer 214 is composed of a transparent material such as an acrylic resin, protects the colored layers, and planarizes the surface of the color filter substrate 210.

In this embodiment, the colored layers 213r, 213g, and 213b are stacked on the light-shielding layers 212B; hence, the light-shielding regions BR can sufficiently shield light. In particular, when the color filter substrate 210 is observed from above, i.e., the upper portion in the drawing, the light reflected at the light-shielding layers 212B is absorbed by these colored layers, thereby preventing degradation in visibility due to light reflected at the light-shielding layers 212B. Moreover, when the color filter substrate 210 is observed from below, i.e., the lower portion of the drawing, reflection of light can be reduced by reducing the thickness of the light-shielding layers 212B or by using a low-reflectance material to make the light-shielding layers 212B. In this case, since a plurality of colored layers is stacked in the light-shielding regions BR, light can be sufficiently shielded even when the reflectance of the reflective light-shielding layer is reduced.

Second Embodiment

Figure 2:
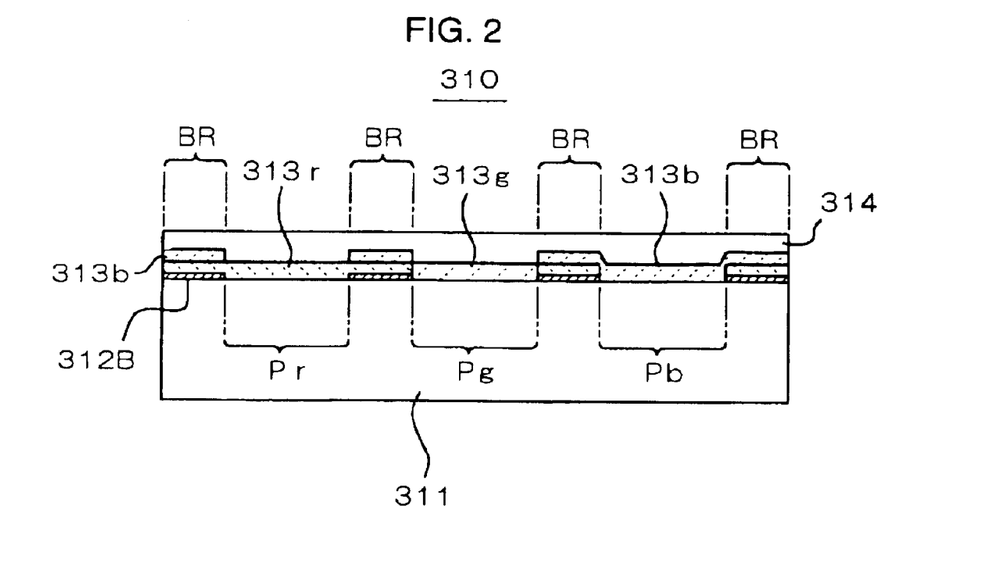
FIG. 2 is a schematic cross-sectional view illustrating the structure of a color filter substrate according to a second embodiment of the present invention.

Next, a color filter substrate 310 of a second embodiment of the present invention is described with reference to FIG. 2. The color filter substrate 310 includes a substrate 311, reflective light-shielding layers 312B, colored layers 313r, 313g, and 313b, and a protection layer 314 which are the same as the corresponding components in the above-described first embodiment. The individual descriptions thereof are thus omitted.

The color filter substrate 310 of this embodiment has the red colored layer 313r and the blue colored layer 313b stacked in a plan view on the reflective light-shielding layer 312B in each light-shielding region BR. Unlike the first embodiment in which three colored layers are stacked, only two colored layer 313r and 313b are stacked on each of the reflective light shielding layers 312B.

In this embodiment, long-wavelength light in the visible region is absorbed by the red colored layer 313r, and short-wavelength light in the visible region is absorbed by the blue colored layer 313b. Thus, almost all light in the visible wavelength region can be sufficiently absorbed by stacking the colored layers 313r and 313b in a plan view. Accordingly, reflection of light can be sufficiently reduced and light can be sufficiently shielded simply by stacking two colored layers 313r and 313b on each reflective light shielding layer 312B. With this structure, the portions at which the colored layers are stacked become relatively thin; thus, the thickness of the color filter substrate 310 can be made smaller than that of the color filter substrate 210 of the first embodiment. Moreover, the surface of the protection layer 314 can be more easily made flat compared to that of the protection layer 214.

Third Embodiment

Figure 3:
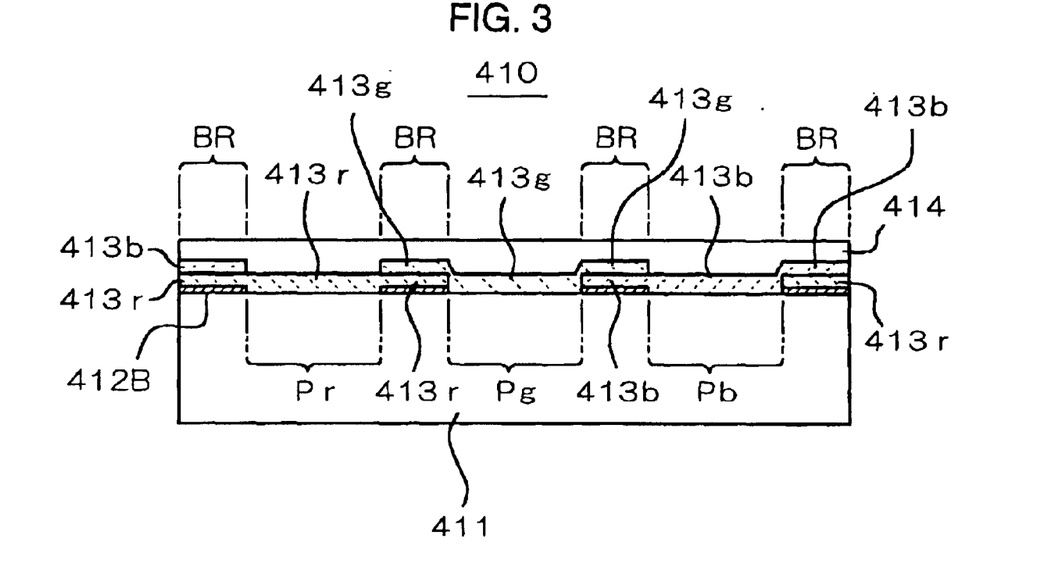
FIG. 3 is a schematic cross-sectional view illustrating the structure of a color filter substrate according to a third embodiment of the present invention.

Next, a color filter substrate of a third embodiment of the present invention is described with reference to FIG. 3. A color filter substrate 410 includes a substrate 411, reflective light-shielding layers 412B, colored layers 413r, 413g, and 413b, and a protection layer 414, which are the same as the corresponding components in the above-described embodiments. The descriptions thereof are thus omitted.

In the color filter substrate 410 of this embodiment, each of the colored layers 413r, 413g, and 413b respectively disposed in the pixel regions Pr, Pg, and Pb extends over the adjacent two light-shielding regions BR. Accordingly, two different colored layers formed in two pixel regions adjacent to each light-shielding region BR extend over to that light-shielding region BR so that two different colored layers are stacked in a plan view on each reflective light-shielding layer 412B.

Thus, the embodiment shown in the drawing has three possible combinations of the colored layers stacked in the light-shielding regions BR: the combination of the red colored layer 413r and the green colored layer 413g; the combination of the 413g and the blue colored layer 413b; and the combination of the colored layer 413b and the colored layer 413r.

In this embodiment, the thickness of the color filter substrate can be decreased and the flatness of the surface can be improved as in the second embodiment. Moreover, the pattern of each of the red, green, and blue colored layers can be simplified since the three colored layers need only be slightly larger than the pixel regions Pr, Pg, and Pb, respectively, so as to cover the light-shielding regions BR. Thus, the colored layers can be easily formed.

Fourth Embodiment

Figure 4:
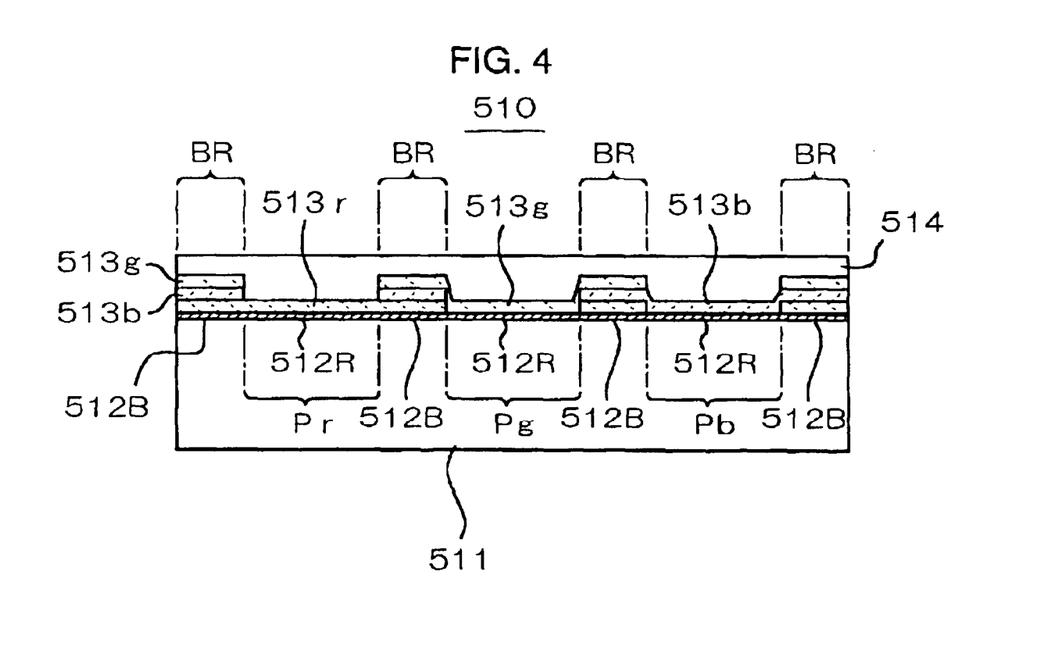
FIG. 4 is a schematic cross-sectional view illustrating the structure of a color filter substrate according to a fourth embodiment of the present invention.

Next, a color filter substrate according to a fourth embodiment of the present invention is described with reference to FIG. 4. A color filter substrate 510 of this embodiment includes a substrate 511, reflective light-shielding layers 512B, colored layers 513r, 513g, and 513b, and a protection layer 514, which are the same as the corresponding components in each of the above-described embodiments. The individual descriptions thereof are thus omitted.

In the color filter substrate 510, the same reflective light-shielding layers as those in each of the above-described embodiments are integrally formed with reflective layers composed of the same material as the reflective light-shielding layers on the substrate 511. The portions inside the pixel regions Pr, Pg, and Pb constitute reflecting layers 512R and the portions inside the light-shielding regions BR constitute reflective light-shielding layers 512B. A color filter comprising colored layers 513r, 513g, and 513b and a protection layer 514 and having substantially the same structure as that of the first embodiment is formed on the reflecting layers 512R and the light-shielding layers 512B.

In this embodiment, the reflecting layer 512R inside the pixel regions are integral with the reflective light-shielding layers 512B inside the light-shielding regions BR. Thus, the color filter substrate can function as a reflective color filter substrate. Three colored layers 513r, 513g, and 513b are stacked in a plan view on the reflective light-shielding layers 512B in the light-shielding regions BR.

Although the reflecting layers 512R and the reflective light-shielding layers 512B are integral in this embodiment, they may be disposed at different levels so that the reflecting layers are separate from the reflective light-shielding layers. Moreover, although this embodiment is a combination of reflecting layers and the basic structure of the first embodiment, the basic structure of the second embodiment or the third embodiment may be used instead of that of the first embodiment.

Fifth Embodiment

Figure 5:
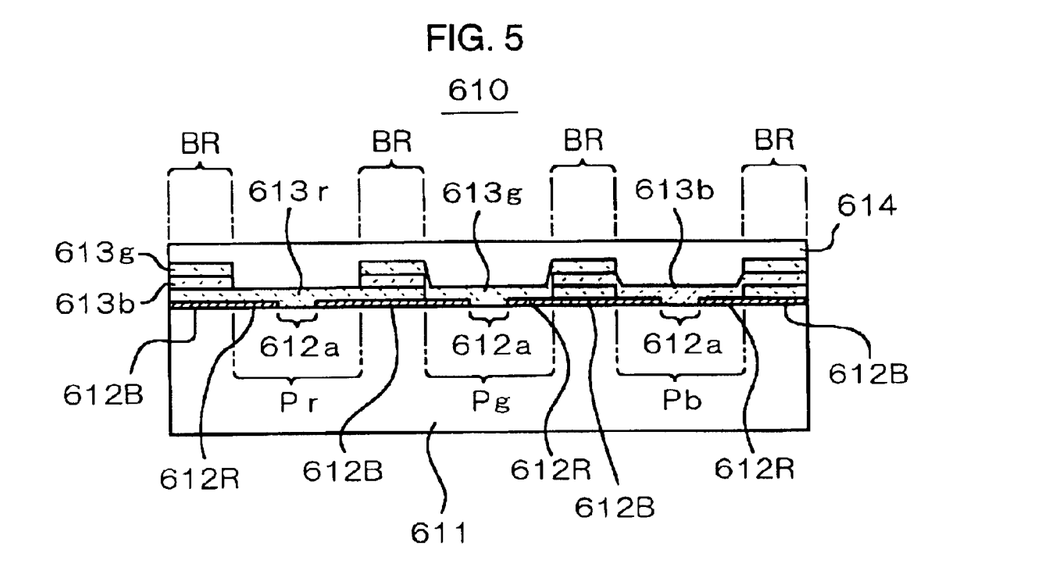
FIG. 5 is a schematic cross-sectional view illustrating the structure of a color filter substrate according to a fifth embodiment of the present invention.

Next, a color filter substrate according to a fifth embodiment of the present invention is described with reference to FIG. 5. A color filter substrate 610 of this embodiment includes a substrate 611, reflecting layers 612R, reflective light-shielding layers 612B, colored layers 613r, 613g, and 613b, and a protection layer 614, which are the same as the corresponding components in the above-described fourth embodiment. The individual descriptions thereof are thus omitted.

In the color filter substrate 610, apertures 612a are formed between the reflecting layers 612R in the pixel regions Pr, Pg, and Pb, respectively. Light passes through these apertures 612a. With this structure, the color filter 610 functions as a transflective color filter.

The colored layers 613r, 613g, and 613b are all stacked in a plan view on the reflective light-shielding layers 612B in the light-shielding regions BR of the color filter substrate 610, as in the fourth embodiment described above. In this embodiment also, the color filter having the structure of the second embodiment or the third embodiment can be used.

Sixth Embodiment

Figure 6:
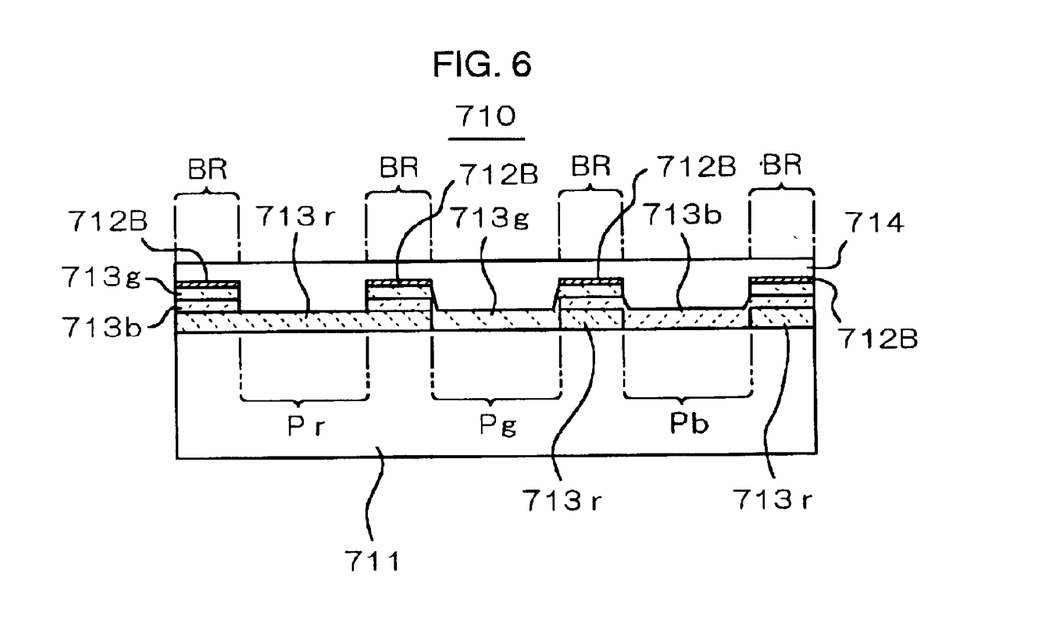
FIG. 6 is a schematic cross-sectional view illustrating the structure of a color filter substrate according to a sixth embodiment of the present invention.

Next, a color filter substrate according to a sixth embodiment of the present invention is described with reference to FIG. 6. A color filter substrate 710 includes a substrate 711, reflective light-shielding layers 712B, colored layers 713r, 713g, and 713b, and a protection layer 714, which are the same as the corresponding components in the above-described first embodiment. The individual descriptions thereof are thus omitted.

The color filter substrate 710 of this embodiment has the colored layers 713r, 713g, and 713b formed on the substrate 711. A plurality of colored layers is stacked in the light-shielding regions BR. The reflective light-shielding layers 712b are selectively formed on the stacked layers in the light-shielding regions BR.

In this embodiment, when observed from below, i.e., the lower portion of the drawing, reflection of light at the reflective light-shielding layers 712B can be inhibited as in each of the above-described embodiments. Moreover, when observed from above, the reflection of light can be reduced by decreasing the thickness of the reflective light-shielding layers 712B and by forming the reflective light-shielding layers 712B with a low-reflectance material. In such a case, a sufficient light-shielding effect can be achieved even when the reflectance of the reflective light-shielding layers 712B is low because a plurality of colored layers are stacked thereunder.

Note that the color filter substrate 710 of this embodiment can be used as a counter substrate of a liquid crystal display panel of a known structure shown in FIG. 10.

Seventh Embodiment

Figure 7:
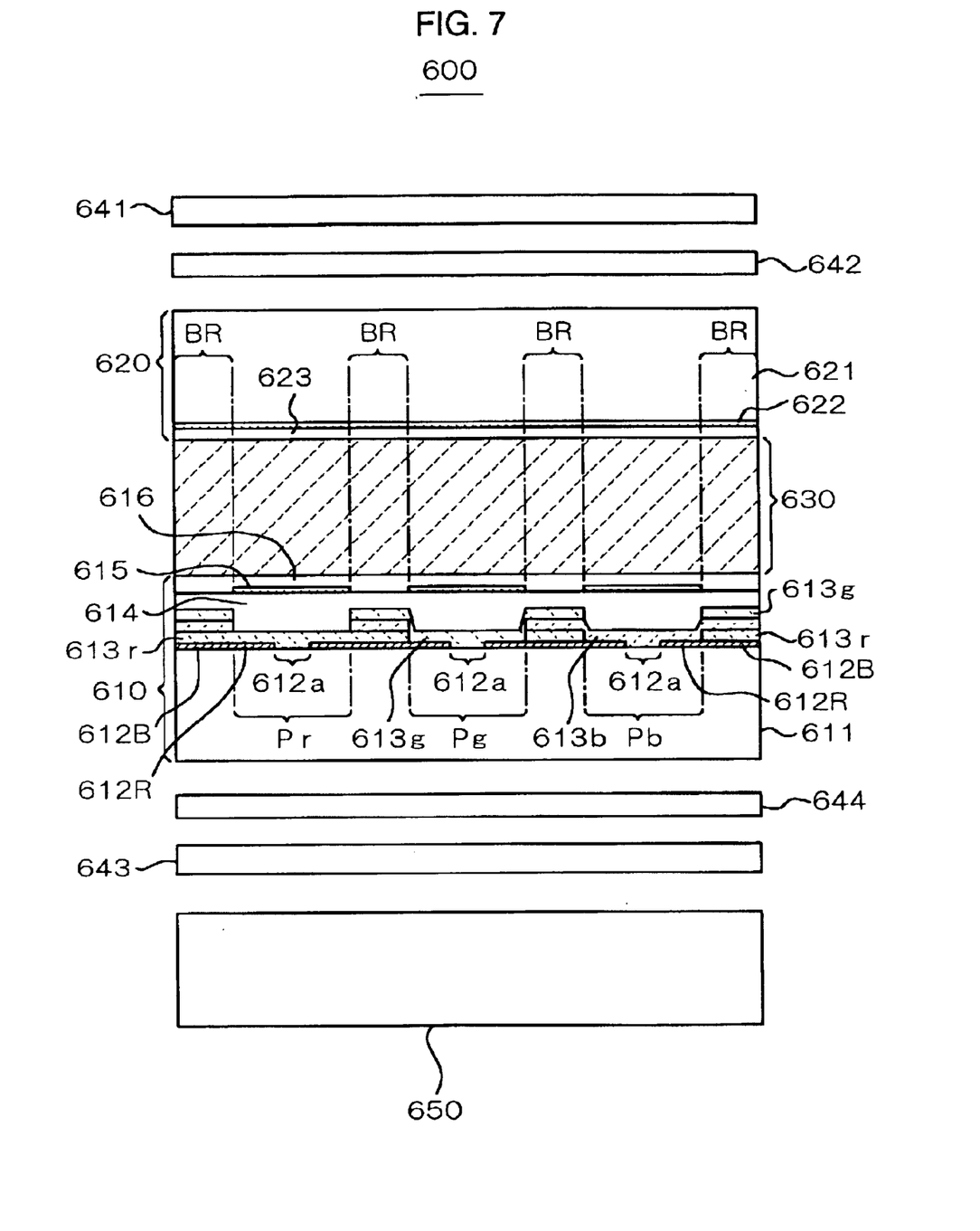
FIG. 7 is a schematic cross-sectional view illustrating the structure of an electro-optical device according to a seventh embodiment of the present invention.

Next, an electro-optical device according to a seventh embodiment of the present invention is described with reference to FIG. 7. The electro-optical device of this embodiment is a liquid crystal display panel 600 made by bonding the color filter substrate 610 of the fifth embodiment to a counter substrate 620 using a sealant (not shown in the drawing) and enclosing liquid crystal 630 between the two substrates.

In this liquid crystal display panel 600, a color filter substrate 610 includes: electrodes 615 having a predetermined pattern, e.g., a stripe pattern, composed of a transparent conductor such as indium tin oxide (ITO) formed on the structure shown of the fifth embodiment; and an alignment film 616 composed of a polyimide resin or the like on the electrodes 615. The alignment film 616 is subjected to orientation such as rubbing.

The counter substrate 620 comprises a substrate 621 composed of glass, plastic, or the like; counter electrodes 622 having a predetermined pattern, e.g., a stripe pattern orthogonal to the electrodes 615, composed of a transparent conductor the same as above; and an alignment film 623 which is the same as above.

A polarizer 641 and a quarter-wave plate 642 are disposed on the outer face of the counter substrate 620. A polarizer 643 and a quarter-wave plate 644 are disposed on the outer face of the color filter substrate 610. A backlight 650 is disposed below the outer face of the polarizer 643.

When the surroundings are bright, the liquid crystal display panel 600 of this embodiment turns the backlight 650 off. External light enters the panel and is reflected at reflecting layers 612R inside the pixel regions Pr, Pg, and Pb, thereby making the display visually recognizable.

At this time, external light also enters the light-shielding regions BR. Since the plurality of colored layers 612r, 612g, and 612b are stacked before the reflective light-shielding layers 612B in the light-shielding regions BR, degradation in the contrast of display due to light reflected at the reflective light-shielding layers 612B can be prevented.

On the other hand, when the surroundings are dark, the backlight 650 is turned on. Light emitted from the backlight 650 passes through the apertures 612a, thereby making the display visually recognizable.

Note that in this embodiment, transflective optical characteristics, i.e., both transmissive and reflective optical characteristics, can be achieved by reducing the thickness of the reflecting layers 612R or by forming the reflecting layers 612R with a half-transmissive material instead of forming apertures between the reflecting layers 612R. In such a case, when the reflecting layers 612R and the reflective light-shielding layers 612B are simultaneously formed using the same material, the reflective light-shielding layers 612B also has a half-transmissive optical characteristic. However, since the plurality of colored layers is stacked in the light-shielding regions BR, a sufficient light-shielding effect can still be obtained.

Instead of using the color filter substrate of the fifth embodiment as in this embodiment, the liquid crystal display panel may include the color filter substrate according to any of the first to fourth embodiments and the sixth embodiment.

Eighth Embodiment

Next, an electronic apparatus of an eighth embodiment incorporating the liquid crystal display panel 600 of the seventh embodiment is described with reference to FIGS. 8 and 9.

Figure 8:
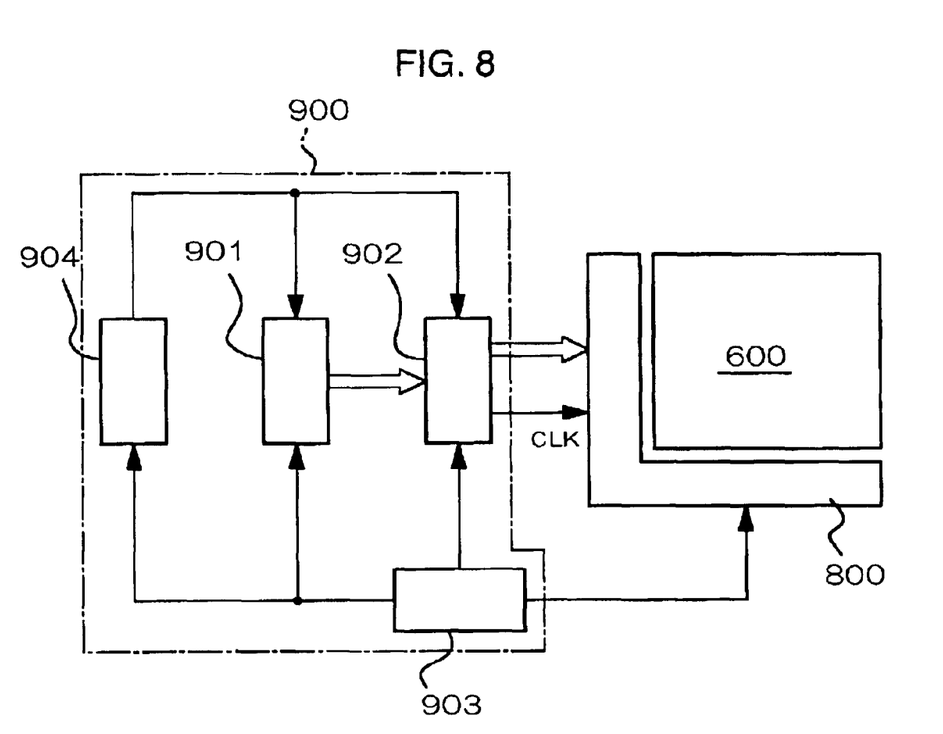
FIG. 8 is a schematic cross-sectional view illustrating the structure of a display system of an electronic apparatus according to an embodiment of the present invention.

FIG. 8 is a schematic structural diagram showing a display system of this embodiment. The electronic apparatus shown in the drawing has the liquid crystal display panel 600 described above, a driving circuit 800 for driving the liquid crystal display panel 600, and a controlling unit 900 for controlling the driving circuit 800. Alternatively, a driving circuit 800 comprising, for example, a semiconductor IC may be mounted on the liquid crystal display panel 600 (chip-on-glass structure). The controlling unit 900 comprises a display information output source 901, a display processing circuit 902, a power circuit 903, and a timing generator 904.

The display information output source 901 includes: a memory comprising a read-only memory (ROM), random access memory (RAM), or the like; a storage unit comprising a magnetic recording disk, an optical recording disk, or the like; and a synchronization circuit for synchronously outputting digital image signals. Based on various clock signals generated by the timing generator 904, the display information output source 901 supplies display information to the display information processing circuit 902 in the form of an image signal of a predetermined format or the like.

The display information processing circuit 902 includes various known circuits such as a serial/parallel conversion circuit, an inverting amplifier circuit, a rotation circuit, a gamma correction circuit, and a clamp circuit. The display information processing circuit 902 processes the input display information and supplies the processed image information along with a clock signal CLK to the above-described driving circuit 800. The driving circuit 800 includes a scan line driving circuit, a data line driving circuit, and an inspection circuit. The power circuit 903 applies a predetermined voltage to each of the above-described components.

Figure 9:
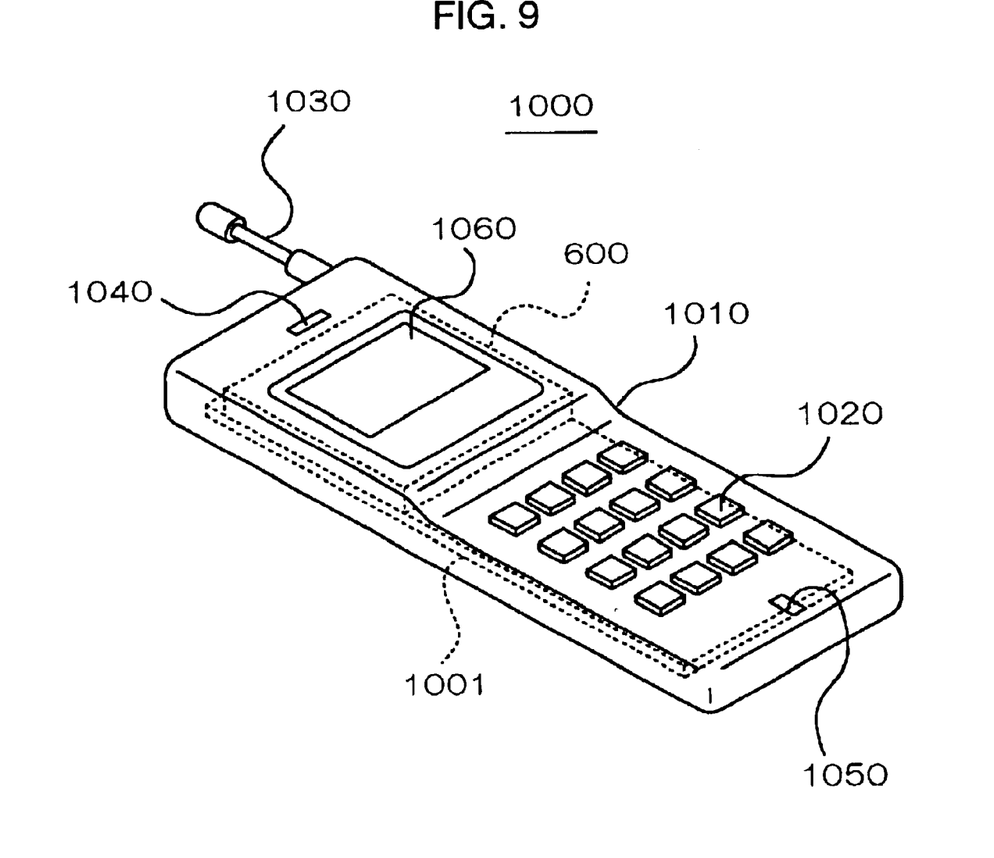
FIG. 9 is a schematic perspective view showing an overview of an example of the above-described embodiment.

FIG. 9 shows a cellular phone 1000 according to an embodiment of the electronic apparatus of the present invention. The cellular phone 1000 has a casing 1010, a circuit substrate 1001 inside the casing 1010, and the above liquid crystal display panel 600 mounted on the circuit substrate 1001.

Rows of operation buttons 1020 are disposed at the front face of the casing 1010. An extendable/retractable antenna 1030 is disposed at one corner of the casing 1010. A speaker is installed inside an earpiece 1040, and a microphone is installed inside a mouthpiece 1050.

The display face of the liquid crystal display panel 600 inside the casing 1010 is visible through a display window 1060.

The liquid crystal device and the electronic apparatus of the present invention are not limited to the above-described examples shown in the drawings. Various modifications are possible without departing from the scope of the present invention. For example, although the liquid crystal panel shown in each of the above-described embodiments is of a simple matrix type, the present invention can be applied to an active matrix liquid crystal device that uses active elements such as thin film transistors (TFTs) or thin film diodes (TFDs).

Advantages

As described above, the present invention can prevent degradation in contrast due to the reflection of light at the reflective light-shielding layers. Moreover, the number of manufacturing steps can be prevented from increasing, and the manufacturing cost can be reduced since the process time can be decreased.

The entire disclosure of Japanese Patent Application No. 2001-334608 filed Oct. 31, 2001 is incorporated by reference.

What is claimed is:

1. A color filter substrate comprising:
    a plurality of pixel regions;
    a substrate having a reflective light-shielding layer which is arranged between the pixel regions; and
    a plurality of colored layers of different colors each of which is arranged in the pixel region corresponding thereto,
    wherein the plurality of colored layers of different colors are stacked in a plan view at a region between the pixel regions,
    wherein the reflective light-shielding layer is entirely overlapped by the stacked colored layers in the region between the pixel regions.

2. The color filter substrate according to claim 1, wherein the reflective light-shielding layer is disposed on the substrate, and the plurality of colored layers of different colors are stacked in a plan view on the reflective light-shielding layer.

3. The color filter substrate according to claim 1, wherein a reflecting layer is formed inside a region where only one of the plurality of colored layers is provided, and the reflective light-shielding layer is either integral with the reflecting layer or composed of the same material as that of the reflecting layer.

4. The color filter substrate according to claim 1, wherein the colored layers stacked in a plan view at the reflective light-shielding layer comprise a red colored layer and a blue colored layer.

5. The color filter substrate according to claim 1, wherein only one colored layer of one color out of the plurality of colored layers is formed in a region disposed on one side of the reflective light-shielding layer, and only another colored layer of a different color out of the plurality of colored layers is formed in a region disposed on the other side of the reflective light-shielding layer,
    wherein the colored layers of the one color and the different color extend over the reflective light-shielding layer so as to be stacked.

6. A method for making a color filter substrate comprising a substrate, a plurality of pixel regions, a reflective light-shielding layer which is arranged between the pixel regions, and a plurality of colored layers of different colors each of which is arranged in the pixel region corresponding thereto, the method comprising:
    a step of forming the plurality of colored layers of different colors so that the colored layers are stacked in a plan view at a region between the pixel regions and the reflective light-shielding layer is entirely overlapped by the stacked colored layers in the region between the pixel region.

7. The method for making the color filter substrate according to claim 6, further comprising a step of forming the reflective light-shielding layer on the substrate, wherein the colored layers of different colors are stacked in a plan view on the reflective light-shielding layer.

8. The method for making the color filter substrate according to claim 6, wherein a reflecting layer is formed inside a region where only one of the plurality of colored layers is provided, and the reflecting layer and the reflective light-shielding layer are simultaneously formed with the same material.

9. The method for making the color filter substrate according to claim 6, wherein the colored layers stacked in a plan view at the reflective light-shielding layer comprise a red colored layer and a blue colored layer.

10. The method for making the color filter substrate according to claim 6, wherein only one colored layer of one color out of the plurality of colored layers is formed in a region on one side of the reflective light-shielding layer, and only another colored layer of a different color out of the plurality of colored layers is formed in a region on the other side of the reflective light-shielding layer,
wherein the colored layers of the one color and the different color extend over the reflective light-shielding layer so as to be stacked thereat.

11. An electro-optical device comprising:
a plurality of pixel regions;
an electro-optical layer having a reflective light-shielding layer which is arranged between the pixel regions; and
a plurality of colored layers of different colors each of which is arranged in the pixel region corresponding thereto,
wherein the plurality of colored layers of different colors are stacked in a plan view at a region between the pixel regions,
wherein the reflective light-shielding layer is entirely overlapped by the stacked colored layers in the region between the pixel regions.

12. The electro-optical device according to claim 11, further comprising a substrate, wherein the reflective light-shielding layer is disposed on the substrate, and the colored layers of different colors are stacked in a plan view on the reflective light-shielding layer.

13. The electro-optical device according to claim 11, wherein a reflecting layer is formed inside a region where only one of the plurality of colored layers is provided, and the reflective light-shielding layer is either integral with the reflecting layer, or composed of the same material as that of the reflecting layer.

14. The electro-optical device according to claim 11, wherein the colored layers stacked in a plan view at the reflective light-shielding layer comprise a red colored layer and a blue colored layer.

15. The electro-optical device according to claim 11, wherein only one colored layer of one color out of the plurality of colored layers is formed in a region disposed on one side of the reflective light-shielding layer, and only another colored layer of a different color out of the plurality of colored layers is formed in a region disposed on the other side of the reflective light-shielding layer,
wherein the colored layers of the one color and the different color extend over the reflective light-shielding layer so as to be stacked thereat.

16. The electro-optical device according to claim 11, wherein the reflective light-shielding layer is disposed at the plurality of colored layers stacked in a plan view, on the side thereof opposite to a viewing side of the device.

17. An electronic apparatus comprising the electro-optical device according to claim 11 and a controlling unit for controlling the electro-optical device.

18. A method for making an electro-optical device comprising a plurality of pixel regions, an electro-optical layer, a reflective light-shielding layer which is arranged between the pixel regions, and a plurality of colored layers of different colors each of which is arranged in the pixel region corresponding thereto, the method comprising:
a step of forming the plurality of colored layers of different colors so that the plurality of colored layers are stacked in a plan view at a region between the pixel regions,
and the reflective light-shielding layer is entirely overlapped by the stacked colored layers in the region between the pixel regions.

19. The method for making the electro-optical device according to claim 18, further comprising a step of forming the reflective light shielding layer on a substrate, wherein the colored layers of different colors are formed on the reflective light-shielding layer so that the colored layers of different colors are stacked in a plan view thereon.

20. The method for making the electro-optical device according to claim 18, wherein a reflecting layer is formed inside a region where only one of the plurality of colored layers is provided, and the reflecting layer and the reflective light-shielding layer are simultaneously formed with the same material.

21. The method for making the electro-optical device according to claim 18, wherein the colored layers stacked in a plan view at the reflective light-shielding layer comprise a red colored layer and a blue colored layer.

22. The method for making the electro-optical device according to claim 18, wherein only one color layer of one color out of the plurality of colored layers is formed in a region on one side of the reflective light-shielding layer, and only another colored layer of a different color out of the plurality of colored layers is formed in a region on the other side of the reflective light-shielding layer,
wherein the colored layers of the one color and the different color extend over the reflective light-shielding layer so as to be stacked.

23. A color filter substrate comprising:
a substrate having a reflective light-shielding layer; and
a plurality of colored layers of different colors,
wherein three of the colored layers are stacked in a plan view at the reflective light-shielding layer.

24. The color filter substrate according to claim 23, wherein three colored layers of different colors are stacked in a plan view at the reflective light-shielding layer.

25. A method for making a color filter substrate comprising a substrate, a reflective light-shielding layer, and a plurality of colored layers of different colors, the method comprising:
a step of forming the plurality of colored layers of different colors so that three of the colored layers are stacked in a plan view at the reflective light-shielding layer.

26. The method for making the color filter substrate according to claim 25, wherein three colored layers of different colors are stacked in a plan view at the reflective light-shielding layer.

27. An electro-optical device comprising:

an electro-optical layer having a reflective light-shielding layer; and a plurality of colored layers of different colors, wherein three of the colored layers are stacked in a plan view at the reflective light-shielding layer.

28. The electro-optical device according to claim 27, wherein three colored layers of different colors are stacked in a plan view at the reflective light-shielding layer.

29. A method for making an electro-optical device comprising an electro-optical layer, a reflective light-shielding layer, and a plurality of colored layers of different colors, the method comprising:

a step of forming the plurality of colored layers of different colors so that three of the colored layers are stacked in a plan view at the reflective light-shielding layer.

30. The method for making the electro-optical device according to claim 29, wherein three colored layers of different colors are stacked in a plan view at the reflective light-shielding layer.

31. A color filter substrate comprising:

a substrate having a reflective light-shielding layer;

a plurality of colored layers of different colors, the plurality of colored layers of different colors being stacked in a plan view at the reflective light-shielding layer; and a reflecting layer formed inside a region where only one of the plurality of colored layers is provided, wherein the reflective light-shielding layer is integral with the reflecting layer and composed of the same material as the reflecting layer.

32. The color filter substrate according to claim 31, wherein the reflecting layer extends across a majority of the region.

33. The color filter substrate according to claim 32, wherein the reflecting layer extends across an entirety of the region.

34. A method for making a color filter substrate comprising a substrate, a reflective light-shielding layer, a reflecting layer, and a plurality of colored layers of different colors, the method comprising:

a step of simultaneously forming with the same material the reflective light-shielding layer and the reflecting layer; and a step of forming the plurality of colored layers of different colors so that the colored layers are stacked in a plan view at the reflective light-shielding layer, wherein the reflecting layer is formed inside a region where only one of the plurality of colored layers is provided.

35. The method for making the color filter substrate according to claim 34, wherein the reflecting layer is formed to extend across a majority of the region.

36. The method for making the color filter substrate according to claim 35, wherein the reflecting layer is formed to extend across an entirety of the region.

* * * * *